UNITED STATES PATENT OFFICE.

HARRY EDMOND GOTLEB, OF NEW YORK, N. Y., ASSIGNOR TO HENRY WINSLOW.

IMPROVEMENT IN RENDERING ANIMAL FATS.

Specification forming part of Letters Patent No. 96,423, dated November 2, 1869.

*To all whom it may concern:*

Be it known that I, HARRY EDMOND GOTLEB, of New York city, county of New York, State of New York, have invented certain new and useful Improvements in the Art of Rendering Animal Fats and Analogous Material; and I do hereby declare that the following is a full and exact description thereof.

The nature of my said invention is to convert these rough materials into a superior bleached and purified tallow and lard.

It has hitherto been the practice of rendering fats in iron kettles and boilers at temperatures varying from 300° to 500° and higher of Fahrenheit by means of fire and high-pressure steam, the former being used under or outside said vessels and the latter between double jackets or direct into the mass. Now, from experiments I have found that in ordinary rendering certain portions of nearly all fats are reduced and acted on at a low temperature or a little above boiling-heat of water, but that the bulk of matter is only partially acted on, hence the necessity of employing the present injurious high temperature. I also find that the said portion of tallow or lard thus obtained is very pure and much whiter than the resulting bulk afterward obtained. I account for this on the supposition that the high temperature of the steam or fire used, notwithstanding the materials may be kept stirred, caused a certain amount of impure carbonization or coloring of the mass.

Now, I am aware that many attempts have been made to bleach tallow by the use of alkalies, and also to employ sulphuric acid in the reduction of fats; but hitherto the use of simple acids, although effecting a speedy dissolution of animal fiber or tissue, (so freeing the oil,) has left certain well-known and undesirable results, which necessitated an after purification or bleaching.

Now, my invention consists in a plan or method of producing a perfectly purified, odorless, and bleached tallow by one single operation, and at the same time the maximum amount of product, free from any carbonization or coloring-matter whatever.

I use a wooden tank lined with lead, (but can also substitute slate, large earthen or glass vessels, but the former is preferred,) and, owing to the powerful corrosive nature of my chemicals, iron or copper vessels or plain wood are inadmissible. Into this vessel (the shape immaterial) I put my fat or rough material, (however, first introducing water to cover the bottom about twelve inches deep,) and submit to the direct action of low-pressure steam driven into this layer of water. In two hours the first portion of tallow or lard is obtained, which is run off. Next, I introduce on the remaining refractory or fibrous mass a small percentage (three per cent. per weight of material) of a mixture composed of muriatic (ten parts) and sulphuric acid (ninety parts) diluted with seventy-five per cent. of water. This mixed acid by its gravity sinks into the substratum of water already in the tank or vessel. At this stage care must be observed to have a layer of water, so as to prevent the direct action of steam on the material, thus insuring against carbonization or colorization. The said steam is forced in near the bottom, which heats the water or dilute, (double acids,) which then acts very quickly on the animal tissue floating on the surface. The liberated oil or tallow passes out of this layer by its lighter gravity just as soon as liberated, its place being then occupied by unreduced material, which is then acted upon, and so on till all is finished. In one or two hours the whole of the oily fats, lards, or tallows is completely separated from the fibrous and bone constituents. This latter, together with the substratum of acid of water, is now drawn off, fresh water is added, say, a layer of one or two feet, and the mass well saturated or washed by stirring. I then add a percentage of carbonate of lime (marble) in coarse powder, which sinks and is allowed to remain at the bottom for about thirty minutes, in course of which time the acid previously used is entirely absorbed or neutralized in the mass, yielding a pure material free from acid, which is then drawn off into coolers, to be casked in the usual manner. I, however, sometimes vary my present plan by at once submitting the entire mass to the action of the acid, particularly when operating on fibrous or very refractory material, and then treat as above described. The effect of the compound acid (chloro-sulphuric) is twofold—first, having a much more powerful reducing action than either of the simple acids separately, and, second, a great bleaching or decoloring property, which is not obtained by either of these acids separately used.

The above method requires no higher temperature than boiling water, thus effecting a considerable saving in the cost of apparatus, which consists of a simple tank of any size or shape.

My invention therefore consists of low-temperature manipulation of fats in vessels constructed of or lined with lead or other material incapable of combination with acids.

What I claim more especially as my invention is—

The use of the compound (chloro-sulphuric) acid substantially in the manner and for the purposes above set forth, the neutralization of said acids in the manner as above set forth by the use of an alkaline earth or some compound of those substances.

H. E. GOTLEB.

Witnesses:
 THO. M. SELL,
 EDWIN F. CURRY, Jr.